(12) United States Patent
Kim et al.

(10) Patent No.: US 9,478,789 B2
(45) Date of Patent: Oct. 25, 2016

(54) RECHARGEABLE BATTERY

(71) Applicant: SAMSUNG SDI CO., LTD., Yongin-si, Gyeonggi-do (KR)

(72) Inventors: Dukjung Kim, Yongin-si (KR); In Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 370 days.

(21) Appl. No.: 13/874,426

(22) Filed: Apr. 30, 2013

(65) Prior Publication Data
US 2014/0199562 A1 Jul. 17, 2014

(30) Foreign Application Priority Data

Jan. 16, 2013 (KR) ........................ 10-2013-0004991

(51) Int. Cl.
*H01M 2/04* (2006.01)
*H01M 2/34* (2006.01)
(Continued)

(52) U.S. Cl.
CPC ............... *H01M 2/348* (2013.01); *H01M 2/06* (2013.01); *H01M 2/26* (2013.01); *H01H 2085/025* (2013.01); *H01M 2/0217* (2013.01); *H01M 2/30* (2013.01); *H01M 2200/103* (2013.01)

(58) Field of Classification Search
CPC ................... H01H 2085/025; H01M 10/0431; H01M 10/0463; H01M 2200/103; H01M 2/0217; H01M 2/0404; H01M 2/06; H01M 2/26; H01M 2/30; H01M 2/348
USPC .............................................. 429/7, 61, 179
See application file for complete search history.

(56) References Cited

U.S. PATENT DOCUMENTS

2003/0077484 A1* 4/2003 Cho .................................. 429/7
2011/0177387 A1* 7/2011 Byun et al. ................... 429/178
(Continued)

FOREIGN PATENT DOCUMENTS

EP  2 333 871 A1  6/2011
EP  2 348 558 A1  7/2011
(Continued)

OTHER PUBLICATIONS

EPO Search Report dated Apr. 28, 2014, for corresponding European Patent application 13175485.5, (13 pages).
(Continued)

*Primary Examiner* — Nicholas P D'Aniello
*Assistant Examiner* — Ling R Zeng
(74) *Attorney, Agent, or Firm* — Lewis Roca Rothgerber Christie LLP

(57) ABSTRACT

A rechargeable battery including an electrode assembly including a first electrode plate, a second electrode plate, and a separator interposed between the first electrode plate and the second electrode plate, a first current collector plate electrically coupled to the first electrode plate and including a fuse, a second current collector plate electrically coupled to the second electrode plate, a case accommodating the electrode assembly, the first current collector plate, and the second current collector plate, a cap assembly sealing the case and including a cap plate, a first electrode terminal electrically coupled to the first current collector plate and a second electrode terminal electrically coupled to the second current collector plate, the first electrode terminal and the second electrode terminal passing through the cap plate, and an insulation cover surrounding a region between the cap plate and the electrode assembly, the region including the first electrode terminal and the fuse.

19 Claims, 6 Drawing Sheets

(51) Int. Cl.
*H01M 2/06* (2006.01)
*H01M 2/26* (2006.01)
*H01M 2/02* (2006.01)
*H01M 2/30* (2006.01)
*H01H 85/02* (2006.01)

(56) References Cited

U.S. PATENT DOCUMENTS

| | | | |
|---|---|---|---|
| 2011/0183193 A1 | 7/2011 | Byun et al. | |
| 2011/0305928 A1* | 12/2011 | Kim et al. | 429/61 |
| 2012/0214031 A1 | 8/2012 | Kim | |
| 2012/0251851 A1 | 10/2012 | Kim et al. | |
| 2012/0251852 A1 | 10/2012 | Kim | |
| 2013/0011699 A1 | 1/2013 | Kim et al. | |
| 2013/0101875 A1* | 4/2013 | Kim et al. | 429/61 |

FOREIGN PATENT DOCUMENTS

| | | |
|---|---|---|
| EP | 2 395 576 A1 | 12/2011 |
| EP | 2 509 149 A1 | 10/2012 |
| EP | 2 521 207 A2 | 11/2012 |
| EP | 2 544 265 A1 | 1/2013 |
| JP | 10-3901 A | 1/1998 |
| JP | 2002-343336 | 11/2002 |
| JP | 2006-012602 | 1/2006 |
| KR | 10-1042808 | 6/2011 |
| KR | 10-2011-0135805 | 12/2011 |
| KR | 10-2012-0094994 | 8/2012 |
| KR | 10-2012-0110825 | 10/2012 |
| KR | 10-2012-0112991 | 10/2012 |

OTHER PUBLICATIONS

Patent Abstracts of Japan, and English machine translation of Japanese Publication 2002-343336 dated Nov. 29, 2002, (16 pages).
Patent Abstracts of Japan, and English machine translation of Japanese Publication 2006-012602 dated Jan. 12, 2006, (10 pages).
KIPO Office action dated Mar. 22, 2016, for Korean priority Patent application 1-2013-0004991, (10 pages).
English machine translation of Japanese Patent 10-3901 dated Jan. 6, 1998, (10 pages).

* cited by examiner

RECHARGEABLE BATTERY

CROSS-REFERENCE TO RELATED APPLICATION

This application claims priority to and the benefit of Korean Patent Application No. 10-2013-0004991, filed on Jan. 16, 2013, the entire content of which is incorporated herein by reference.

BACKGROUND

1. Field

The present invention relates to a rechargeable battery.

2. Description of the Related Art

Unlike a primary battery that is not designed to be recharged, a rechargeable battery (or secondary battery) is a battery that is designed to be repeatedly charged and discharged. Low-capacity rechargeable batteries having a single cell are often used in small portable electronic apparatuses, such as mobile phones and camcorders. Large-capacity rechargeable batteries that include a plurality of rechargeable cells connected in a pack shape are often used as a power source for driving a motor of a hybrid electric vehicle and the like.

Rechargeable batteries are manufactured in various shapes, for example a cylindrical shape and a prismatic shape. A rechargeable battery is typically constructed with an electrode assembly in which a positive electrode and a negative electrode are disposed with a separator interposed between the positive and negative electrodes, a case accommodating the electrode assembly, and a cap assembly having an electrode terminal on the case.

The rechargeable battery may be subjected to ignition or explosion due to an increase in the internal pressure when excessive heat is generated due to overcharge or when an electrolyte is decomposed. Accordingly, it is desirable to provide a rechargeable battery constructed with improved safety.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery which can improve safety by suppressing generation of a discharge after a fuse function is actuated.

According to an embodiment of the present invention, a rechargeable battery is provided including an electrode assembly including a first electrode plate, a second electrode plate, and a separator interposed between the first electrode plate and the second electrode plate, a first current collector plate electrically coupled to the first electrode plate and including a fuse, a second current collector plate electrically coupled to the second electrode plate, a case accommodating the electrode assembly, the first current collector plate, and the second current collector plate, a cap assembly sealing the case and including a cap plate, a first electrode terminal electrically coupled to the first current collector plate and a second electrode terminal electrically coupled to the second current collector plate, and the first electrode terminal and the second electrode terminal passing through the cap plate, and an insulation cover surrounding a region between the cap plate and the electrode assembly, the region including the first electrode terminal and the fuse.

The first current collector plate may include a connection part coupled to the first electrode terminal and an extension part extending at an angle from the connection part toward the electrode assembly and electrically coupled to the electrode assembly.

The fuse may be formed at or near a corner at which the connection part and the extension part meet.

A region where the fuse is located may have a smaller width than a region surrounding the fuse in a plane that is substantially parallel to a top surface of the cap plate.

The insulation cover may have a first opening extending in a first direction from the fuse to the cap plate, and a second opening extending in the first direction and spaced from the first opening and configured to allow the first electrode terminal to pass therethrough, and may include a groove extending in a second direction opposite to the first direction and corresponding to the fuse.

The insulation cover may be formed by insert molding.

A portion of the first opening may be filled with insulating powder.

The insulating powder may include a glass powder or a powder resin.

In addition, the insulating powder may have a melting point that is lower than that of the fuse.

The groove may have a polygonal or circular shape in a plane that is substantially parallel to a top surface of the cap plate.

A fuse cover may seal the first opening.

The fuse cover may include a horizontal part corresponding to the first opening, and a vertical part extending from an edge of the horizontal part towards the fuse.

The vertical part may correspond with a fuse opening in the fuse.

The fuse cover may further include a first stepped part at the edge of the horizontal part and directed toward the vertical part.

A mounting part corresponding to the first stepped part may be at an upper portion of the first opening.

The fuse cover may further include a second stepped part at the edge of the horizontal part in a direction opposite to the vertical part.

The cap assembly may include a first short-circuit plate, which is an inversion plate, installed in a short-circuit opening in the cap plate, and a second short-circuit plate electrically coupled to the second current collector plate located outside of and spaced from the cap plate and covering the short-circuit opening.

According to another embodiment of the present invention, a rechargeable battery is provided including an electrode assembly including a first electrode plate, a second electrode plate, and a separator interposed between the first electrode plate and the second electrode plate; a first current collector plate electrically coupled to the first electrode plate and including a fuse; a second current collector plate electrically coupled to the second electrode plate; a case accommodating the electrode assembly, the first current collector plate, and the second current collector plate; a cap assembly sealing the case and including a cap plate; a first electrode terminal electrically coupled to the first current collector plate and a second electrode terminal electrically coupled to the second current collector plate, the first electrode terminal and the second electrode terminal passing through the cap plate; and an insulation cover surrounding a region between the cap plate and the electrode assembly, the region including the first electrode terminal and the fuse, wherein a region of the insulation cover above the fuse part is filled with insulating powder.

The insulating powder may include a glass powder or a powder resin.

The insulating powder may have a melting point that is lower than that of the fuse.

As described above, because the rechargeable battery according to embodiments of the present invention includes an insulation cover surrounding a region between a cap plate and an electrode assembly and surrounding a fuse, a discharge occurring after a fuse function is actuated can be prevented, thereby improving safety of the rechargeable battery.

In addition, because the rechargeable battery according to embodiments of the present invention includes an insulation cover having insulating powder in a first opening above a fuse, it is possible to prevent the fuse from becoming deteriorated by the insulating powder melting before the fuse function is actuated.

In addition, because the rechargeable battery according to embodiments of the present invention includes a fuse cover sealing a first opening of an insulation cover, it is possible to prevent the insulating powder from being exposed.

Additional aspects and/or features of the invention will be set forth in part in the description which follows and, in part, will be obvious from the description or may be learned by practice of the invention.

BRIEF DESCRIPTION OF THE DRAWINGS

The features and aspects of the present invention will be more apparent from the following detailed description in conjunction with the accompanying drawings, in which.

DETAILED DESCRIPTION

The present invention is described more fully hereinafter with reference to the accompanying drawings, in which embodiments of the present invention are shown. These embodiments are provided so that this disclosure is thorough and will convey the scope of the invention to those skilled in the art. The present invention may, however, be embodied in many different forms and should not be construed as limited to the embodiments set forth herein.

Figure 1:
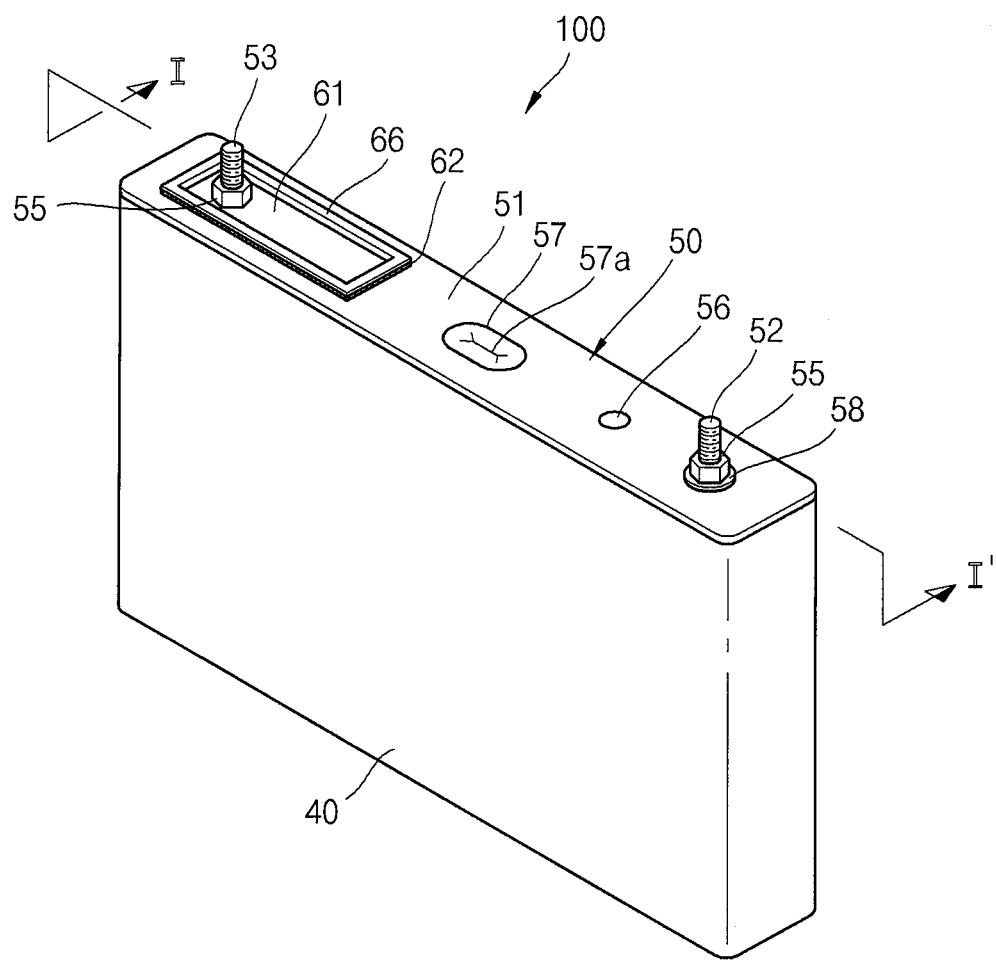
FIG. 1 is a perspective view of a rechargeable battery according to an embodiment of the present invention.
Figure 2:
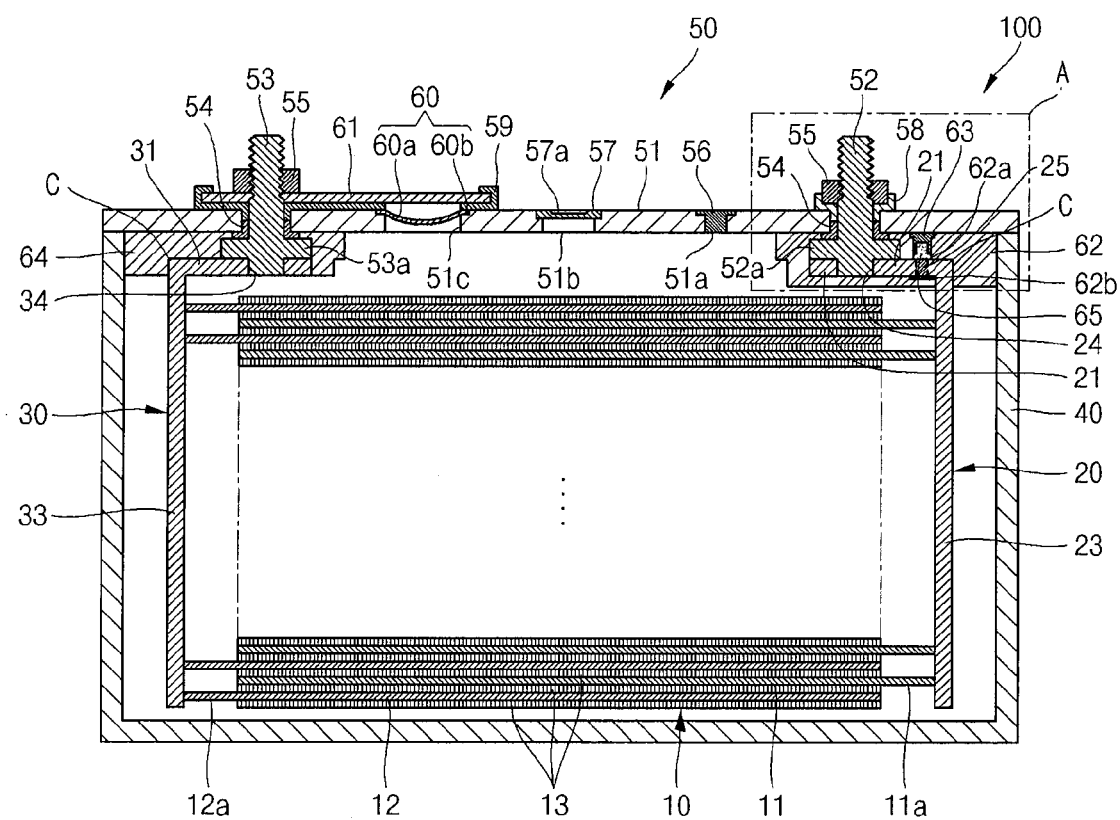
FIG. 2 is a cross-sectional view of the rechargeable battery taken along the line I-I' of FIG. 1.
Figure 3:
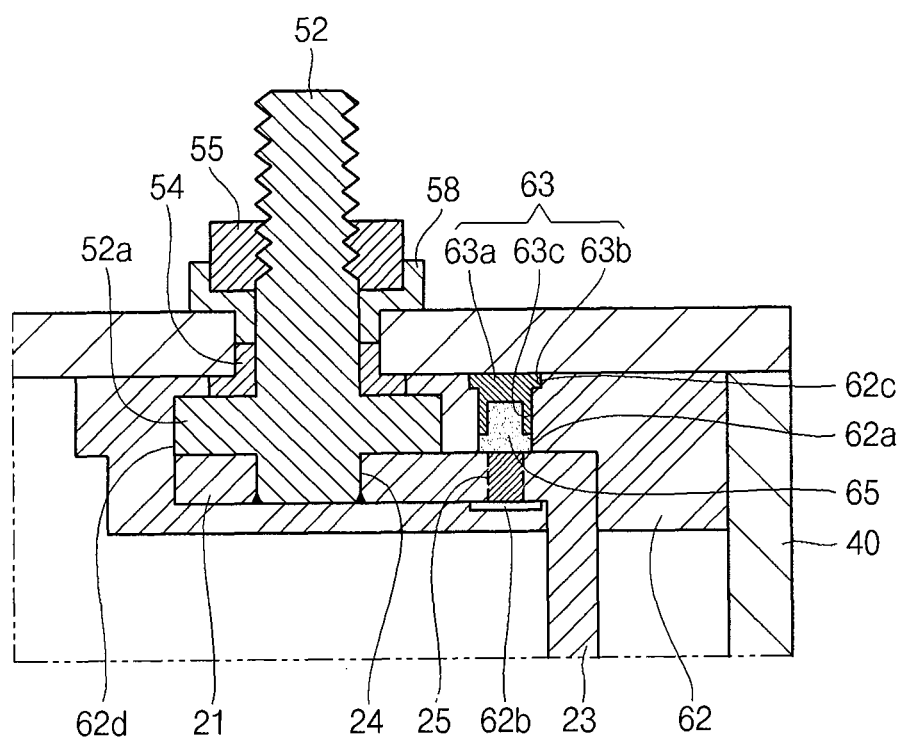
FIG. 3 is an enlarged cross-sectional view illustrating a portion 'A' of FIG. 2.
Figure 4A:
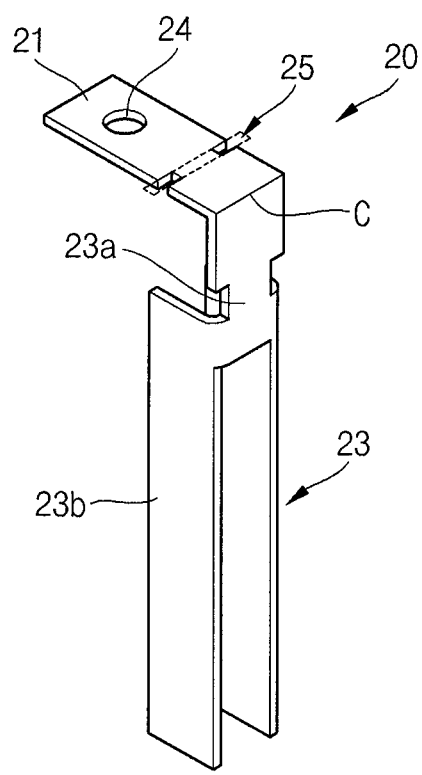
FIG. 4A is a perspective view of a first current collector plate shown in FIG. 2.
Figure 4B:
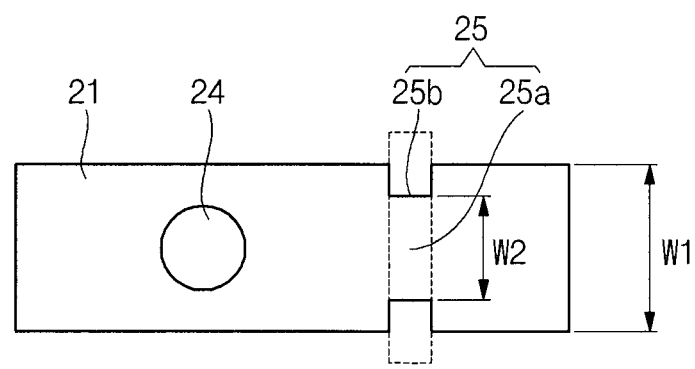
FIG. 4B is a top view of a first current collector plate shown in FIG. 2.
Figure 5A:
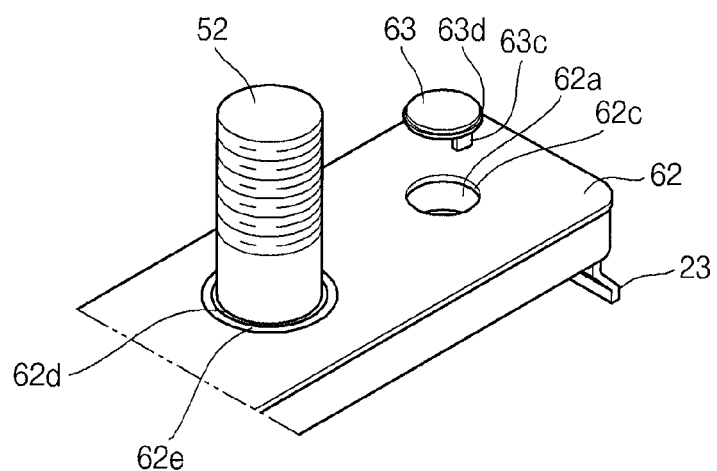
FIG. 5A is a partial perspective view illustrating an assembled state in which a first electrode terminal, a first current collector plate, and an insulation cover, shown in FIG. 2, are assembled with each other.
Figure 5B:
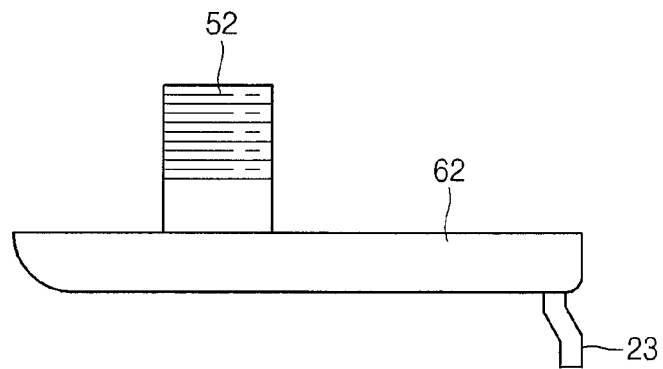
FIG. 5B is a partial front view of FIG. 5A.
Figure 6A:
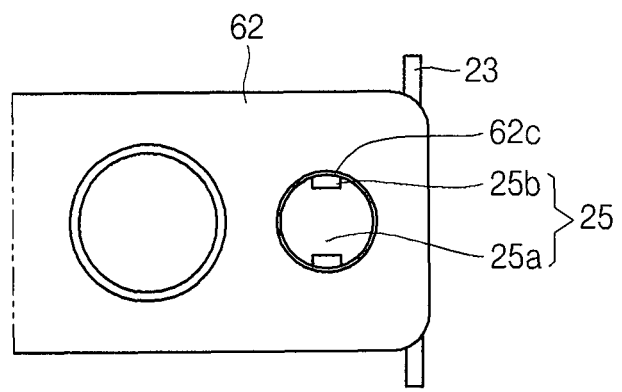
FIG. 6A is a top view illustrating a state in which a fuse cover shown in FIG. 5A is not assembled.
Figure 6B:
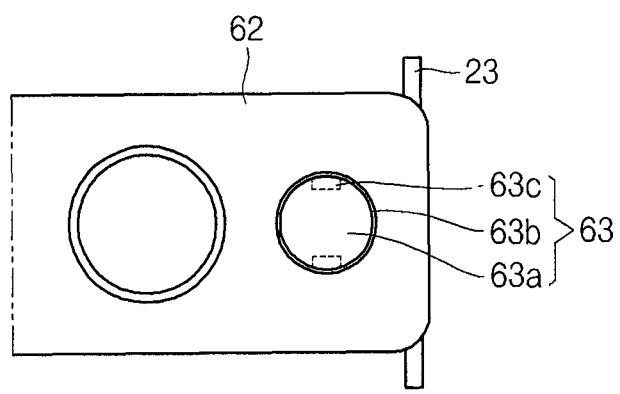
FIG. 6B is a top view illustrating a state in which a fuse cover shown in FIG. 5A is assembled.

FIG. 1 is a perspective view of a rechargeable battery according to an embodiment of the present invention, FIG. 2 is a cross-sectional view of the rechargeable battery taken along the line I-I' of FIG. 1, FIG. 3 is an enlarged cross-sectional view illustrating a portion 'A' of FIG. 2, FIG. 4A is a perspective view illustrating a first current collector plate shown in FIG. 2, FIG. 4B is a top view of a first current collector plate shown in FIG. 2, FIG. 5A is a partial perspective view illustrating an assembled state in which a first electrode terminal, a first current collector plate, and an insulation cover, shown in FIG. 2, are assembled with each other, FIG. 5B is a partial front view of FIG. 5A, FIG. 6A is a top view illustrating a state in which a fuse cover shown in FIG. 5A is not assembled, and FIG. 6B is a top view illustrating a state in which a fuse cover shown in FIG. 5A is assembled.

Referring to FIGS. 1 to 6B, a rechargeable battery 100 according to an embodiment of the present invention includes an electrode assembly 10, a first current collector plate 20, a second current collector plate 30, a case 40, and a cap assembly 50.

The electrode assembly 10 may be formed by winding or laminating a stack including a first electrode plate 11, a separator 13, and a second electrode plate 12. Here, the first electrode plate 11 may be a positive electrode and the second electrode plate 12 may be a negative electrode. However, polarities of the first electrode plate 11 and the second electrode plate 12 may be reversed.

The first electrode plate 11 is formed by coating a first electrode active material, such as a transition metal oxide, on a first electrode current collector formed of a metal foil, made of a material such as aluminum. The first electrode plate 11 includes a first electrode uncoated portion 11a without the first electrode active material coated thereon. The first electrode uncoated portion 11a becomes a path of the flow of current between the first electrode plate 11 and the outside of the first electrode plate 11. However, aspects of the present invention are not limited to the materials of the first electrode plate 11 disclosed herein.

The second electrode plate 12 is formed by coating a second electrode active material, such as graphite or carbon, on a second electrode current collector formed of a metal foil, made of a material such as nickel or copper. The second electrode plate 12 includes a second electrode uncoated portion 12a without the second electrode active material coated thereon. The second electrode uncoated portion 12a becomes a path of the flow of current between the second electrode plate 12 and the outside of the second electrode plate 12. However, aspects of the present invention are not limited to the materials of the second electrode plate 12 disclosed herein.

The separator 13 is positioned between the first electrode plate 11 and the second electrode plate 12 to prevent an electric short-circuit therebetween and to allow lithium ions to move. The separator 13 may be made of polyethylene, polypropylene, or a composite film thereof. However, aspects of the present invention are not limited to the materials of the separator 13 disclosed herein.

A first current collector plate 20 and a second current collector plate 30 are electrically coupled (e.g., electrically connected) to the first electrode plate 11 and the second electrode plate 12 and are coupled at respective ends of the electrode assembly 10.

The first current collector plate 20 is made of a conductive material, such as aluminum or the like, and is coupled (e.g., makes contact) with the first electrode uncoated portion 11a protruding at one end of the electrode assembly 10 which is electrically connected to the first electrode plate 11. Referring to FIGS. 2 and 3, the first current collector plate 20 may include a first connection part 21, a first extension part 23, a first terminal hole 24 (e.g., first terminal opening), and a fuse 25 (e.g., fuse part).

The first connection part 21 has a shape of a plate and is located (e.g., installed) between an upper portion of the electrode assembly 10 and a lower portion of the cap assembly 50. One end of the first connection part 21 is connected to a first electrode terminal 52 and the other end of the first connection part 21 is connected to the first extension part 23, for instance by welding.

The first extension part 23 extends at an angle (e.g., is bent) at an end of the first connection part 21 and has a shape of a plate. The first extension part 23 substantially contacts the first electrode uncoated portion 11a. As shown in FIG. 4A, a corner at which the first connection part 21 and the first extension part 23 meet is denoted by reference character 'C', and the first connection part 21 and the first extension part 23 are substantially perpendicular to each other about the corner C.

The first extension part 23 has a body part 23a and a branch part 23b. The body part 23a has a shape of a plate and extends at an angle (e.g., is bent) at the end of the first connection part 21. The branch part 23b extends from the body part 23a to the electrode assembly 10 and makes contact, such as by welding, with the first electrode uncoated portion 11a. The branch part 23b may include a plurality of branch parts so as to correspond to the electrode assembly 10.

The first terminal hole 24 (e.g., first terminal opening or through hole) is formed at one side of the first connection part 21 and provides a space in which a first electrode terminal 52 of the cap assembly 50 is coupled (e.g., fitted) to the first terminal hole 24. Here, the first terminal hole 24 is spaced (e.g., positioned or spaced far apart) from the corner C of the first connection part 21.

The fuse 25 is located at (e.g., formed in) the first connection part 21. In detail, the fuse 25 is formed at or near the corner at which the first connection part 21 and the first extension part 23 meet. The fuse 25 includes a fuse body 25a (e.g., fuse body part) and a fuse hole 25b (e.g., fuse opening). The fuse body 25a is formed in the first connection part 21 and is spaced (e.g., spaced apart) from the first terminal hole 24. The fuse hole 25b is formed (e.g., inwardly formed) at both sides of the fuse body 25a (e.g., formed in a direction perpendicular to a lengthwise direction of the first connection part 21). A width W2 of a region where the fuse body 25a is formed is smaller than a width W1 of a peripheral region of the fuse 25 in a plane that is substantially parallel to a top surface of a cap plate 51. Here, the widths W1 and W2 are vertical widths with respect to the lengthwise direction of the first connection part 21. In other words, the fuse 25 has a smaller cross-sectional area than a region of the first connection part 21 other than the region where the fuse 25 is formed. The fuse 25 functions as a fuse to prevent (e.g., selectively prevent) the flow of current such that the region where the fuse 25 is formed is melted by heat occurring when a large amount of current flows through the rechargeable battery 100, for instance, due to a short circuit. Here, the short circuit may be induced by making a first short-circuit plate 60 and a second short-circuit plate 61 contact each other when excessive heat or pressure is generated, for instance, due to overcharge of the rechargeable battery 100 or when an electrolyte is decomposed. Accordingly, the region where the fuse 25 is formed may melt, for instance due to the induced short-circuit discussed above, thereby preventing the flow of current and suspending a charge or discharge operation of the rechargeable battery 100 before an undesirable event, such as ignition or explosion, takes place.

The second current collector plate 30 is made of a conductive material, such as nickel or the like, and makes contact with the second electrode uncoated portion 12a protruding at the other end (e.g., opposite end) of the electrode assembly 10 and is electrically connected to the second electrode plate 12. The second current collector plate 30 includes a second connection part 31, a second extension part 33, and a second terminal hole 34 (e.g., second terminal opening).

The second current collector plate 30 has substantially the same or similar shape and functions as those of the first current collector plate 20, shown in FIG. 3, except for a configuration (e.g., inclusion or formation) of a fuse, and repeated explanations of the second current collector plate 30 will be omitted. Because the first current collector plate 20 includes a fuse 25 functioning as a fuse, the second current collector plate 30 may not include a structure corresponding to the fuse 25. For example, when the first current collector plate 20 is made of aluminum and the second current collector plate 30 is made of nickel, the rechargeable battery 100 can perform a fuse function more easily because the first current collector plate 20 would have a melting point that is lower than that of the second current collector plate 30. However, when the fuse 25 of the first current collector plate 20 does not operate, a fuse may also be formed in the second current collector plate 30, thereby allowing the rechargeable battery 100 to keep performing a fuse function.

The case 40 may be made of a conductive metal, such as aluminum, an aluminum alloy, or nickel plated steel, and may have a substantially rectangular parallelepiped prismatic shape having an opening for receiving the electrode assembly 10, the first current collector plate 20, and the second current collector plate 30. The opening is not shown in FIG. 2 because the case 40 and the cap assembly 50 are coupled to each other. The opening is a substantially opened portion along the periphery of the cap assembly 50. The internal surface of the case 40 may be insulated (e.g., coated with an insulating material) from the electrode assembly 10, the first current collector plate 20, the second current collector plate 30, and the cap assembly 50. Here, the case 40 may have a polarity, for example, a positive polarity.

The cap assembly 50 is coupled to (e.g., joined with) the case 40. In detail, the cap assembly 50 may include the cap plate 51, the first electrode terminal 52, the second electrode terminal 53, a gasket 54, and a nut 55. In addition, the cap assembly 50 may include a plug 56, a vent plate 57, a connecting plate 58, an upper insulator 59 (e.g., upper insulation member), the first short-circuit plate 60, the second short-circuit plate 61, and a lower insulator 64 (e.g., lower insulation member).

The cap plate 51 has top and bottom surfaces and seals the opening of the case 40, and may be made of the same material as the case 40. The cap plate 51 may have the same polarity as the case 40.

The cap plate 51 may have an electrolyte injection hole 51a, a vent hole 51b, and a short-circuit hole 51c (e.g., short-circuit opening).

The first electrode terminal 52 passes through one side of the cap plate 51 and is electrically coupled (e.g., electrically connected) to the first current collector plate 20. The first electrode terminal 52 may have a shape of a pillar, and the outer circumference of an upper, exposed portion (e.g., upper pillar) of the first terminal 52 may be fastened (e.g., screw-fastened) to an upper side of the cap plate 51. A flange 52a is formed at a lower portion (e.g., lower pillar) of the first terminal 52 and positioned under the cap plate 51 to prevent the first electrode terminal 52 from being dislodged from the cap plate 51. A portion (e.g., lower pillar) of the first electrode terminal 52 located (e.g., positioned) under the flange 52a is coupled with (e.g., fitted into) the first terminal hole 24 of the first current collector plate 20. Here, the first electrode terminal 52 may be electrically connected to the cap plate 51.

The second electrode terminal 53 passes through the other side (e.g., opposite side) of the cap plate 51 and is electrically coupled (e.g., electrically connected) to the second current collector plate 30. Because the second electrode terminal 53 has the same shape as the first electrode terminal 52, a repeated explanation of the second electrode terminal 53 will be omitted. The second electrode terminal 53 is insulated from the cap plate 51.

The gasket 54 is made of an insulating material and is positioned between the first electrode terminal 52 and the cap plate 51 and between the second electrode terminal 53 and the cap plate 51. The gasket 54 seals a space between the first electrode terminal 52 and the cap plate 51 and between the second electrode terminal 53 and the cap plate 51. The gasket 54 prevents (or substantially prevents) external moisture from permeating into the inside of the rechargeable battery 100 and prevents (or substantially prevents) an electrolyte contained in the rechargeable battery 100 from flowing out.

The nut 55 is engaged with a thread formed at each of the first electrode terminal 52 and the second electrode terminal 53 to fix the first electrode terminal 52 and the second electrode terminal 53 to the cap plate 51, respectively.

The plug 56 seals an electrolyte injection hole 51a of the cap plate 51. The vent plate 57 is located at (e.g., installed in) the vent hole 51b of the cap plate 51 and has a notch 57a configured to be opened at a critical (e.g., predetermined) pressure.

The connecting plate 58 is disposed (e.g., located) between the first electrode terminal 52 and the cap plate 51 and allows the first electrode terminal 52 to be fitted thereto. The connecting plate 58 makes close contact with the cap plate 51 and the gasket 54. The connecting plate 58 electrically couples (e.g., connects) the first electrode terminal 52 to the cap plate 51.

The upper insulator 59 is disposed (e.g., located) between the second electrode terminal 53 and the cap plate 51 and allows the second electrode terminal 53 to be fitted thereto. The upper insulator 59 makes close contact (e.g., direct contact) with the cap plate 51 and the gasket 54. The upper insulator 59 insulates the second electrode terminal 53 from the cap plate 51.

The first short-circuit plate 60 is disposed (e.g., located) in the short-circuit hole 51c of the cap plate 51 between the upper insulator 59 and the cap plate 51. The first short-circuit plate 60 may be formed as an inversion plate having a round part 60a that is downwardly convex and an edge part 60b surrounding the round part 60a and fixed to the cap plate 51. When the internal pressure of the rechargeable battery 100 exceeds a critical (e.g., predetermined) pressure, for instance, due to overcharge, the first short-circuit plate 60 becomes inverted to be (e.g., to protrude to be) upwardly convex. Here, the first short-circuit plate 60 has the same polarity as the cap plate 51.

The second short-circuit plate 61 is configured (e.g., formed) to allow the second electrode terminal 53 to be fitted thereto and is spaced (e.g., spaced apart) from the cap plate 51, that is, over the upper insulator 59 and electrically connected to the second electrode terminal 53. In addition, the second short-circuit plate 61 extends to cover the short-circuit hole 51c. When the internal pressure of the rechargeable battery 100 exceeds a critical (e.g., predetermined) pressure, for instance, due to overcharge, the second short-circuit plate 61 makes contact with the first short-circuit plate 60 when it is inverted to protrude to be upwardly convex, thereby inducing a short circuit. If the short circuit is induced, a large amount of current flows through the rechargeable battery 100 and heat (e.g., excess heat) is generated. In such a case, the fuse 25 performs a fuse function, thereby interrupting the flow of current.

The insulation cover 62 is formed to surround the first electrode terminal 52 and the fuse 25 and is located (e.g., positioned) between the cap plate 51 and the electrode assembly 10. In more detail, the insulation cover 62 is formed to surround a region where the first electrode terminal 52 and the first current collector plate 20 are connected to each other inside the case 40 and the region where the fuse 25 is formed. That is to say, the insulation cover 62 is formed to surround a first connection part 21 of the first current collector plate 20 and is positioned between the cap plate 51 and the electrode assembly 10. In addition, the insulation cover 62 is fixed (e.g., coupled) to a bottom surface of the cap plate 51. In a state in which the first current collector plate 20 is coupled to (e.g., engaged with) the first electrode terminal 52, the insulation cover 62 is formed by insert molding so as to surround the first connection part 21 of the first current collector plate 20, thereby preventing a melted material from the fuse 25 from contacting an electrolyte when a short circuit occurs to the rechargeable battery 100.

The insulation cover 62 includes a first hole 62a (e.g., first opening), a space groove 62b (e.g., groove), and a second hole 62d (e.g., second opening).

The first hole 62a is formed in a first direction ranging from (e.g., extending from) the fuse 25 to the cap plate 51. That is to say, the first hole 62a is formed on (or over) the fuse 25. In addition, the first hole 62a is shaped to correspond to the fuse 25 so as to allow the fuse 25 to be seen when viewed from the top surface of the insulation cover 62, as shown in FIG. 6A. A lower region or portion of the first hole 62a is filled with (e.g., contains) insulating powder 65. In addition, a stepped mounting part 62c (e.g., mounting area) is formed at an upper region or portion of the first hole 62a.

The stepped mounting part 62c has a shape that corresponds to a first stepped part 63b of a fuse cover 63 (e.g., fuse cover member) to allow the first stepped part 63b of the fuse cover 63 to be mounted (e.g., fitted or located) thereon.

The space groove 62b is formed in a second direction from (e.g., ranging from) the fuse 25 towards the electrode assembly 10. That is to say, the space groove 62b extends (e.g., is formed) in a direction opposite to the first direction. In other words, the space groove 62b is located (e.g., formed) under the fuse 25. In addition, a shape of the space groove 62b in a plane that is substantially parallel to the top surface of the cap plate 51 is polygonal or circular (e.g., the space groove 62b is polygonal or circular with respect to a vertically cross-sectional shape of the space groove 62b with respect to a lengthwise direction of the first connection part 21 is polygonal or circular). The space groove 62b provides a space in which a melted material from the fuse 25 flows for storage when a short circuit occurs to the rechargeable battery 100.

The second hole 62d (e.g., second opening) is formed in the first direction from (e.g., ranging from) the fuse 25 towards the cap plate 51 (e.g., in the first direction) and is spaced (e.g., spaced apart) from the first hole 62a. The second hole 62d is configured (e.g., shaped) to allow the first electrode terminal 52 to pass therethrough.

The fuse cover 63 is located (e.g., formed) at an upper region of the first hole 62a of the insulation cover 62 to seal (or substantially seal) the first hole 62a.

The fuse cover 63 includes a horizontal part 63a and a vertical part 63c.

The horizontal part 63a has the shape of a plate and corresponds to the first hole 62a when viewed from a top. That is to say, an outer diameter of the horizontal part 63a is substantially equal to an inner diameter of the first hole 62a. Therefore, the thus formed horizontal part 63a seals (or substantially seals) the first hole 62a. In addition, the horizontal part 63a prevents the insulating powder 65, filling the lower region of the first hole 62a, from being exposed. In addition, the first stepped part 63b is directed toward (e.g., facing) a vertical part 63c and is located (e.g., formed) at an edge of the horizontal part 63a. That is to say, the first stepped part 63b is downwardly formed from the edge of the horizontal part 63a. Here, the first stepped part 63b is mounted in the stepped mounting part 62c formed at the upper region of the first hole 62a. In addition, the second stepped part 63d is formed at the edge of the horizontal part 63a in a direction opposite to (e.g., facing away from) the vertical part 63c. That is to say, the second stepped part 63d is upwardly formed from the edge of the horizontal part 63a.

The vertical part 63c extends (e.g., protrudes) from the edge of the horizontal part 63a towards the fuse 25. The vertical part 63c is fitted around (e.g., fitted into) the fuse 25 to allow the fuse cover 63 to be coupled to (e.g., fixed to) the first hole 62a and the fuse 25. In addition, the vertical part 63c may include one or more protrusions (not shown) protruding downwardly from the edge of the horizontal part 63a.

The lower insulator 64 is formed between the second current collector plate 30 and the cap plate 51 and prevents an unnecessary (e.g., unintended) short-circuit.

The insulating powder 65 fills the lower region of the first hole 62a (e.g., is contained in the lower region of the first hole 62a) of the insulation cover 62. That is to say, the insulating powder 65 fills the inside of the first hole 62a formed over the region where the fuse 25 is formed. The insulating powder 65 is made of a material having a melting point that is lower than that of the fuse 25. For example, the insulating powder 65 may have a melting point in a range from about 300° C. to about 500° C., which is lower than that of the fuse 25. The insulating powder 65 may include a glass powder or a powder resin. However, the present invention does not limit the type of the insulating powder 65 to those disclosed herein and the insulating powder 65 may include another insulating material having a melting point that is lower than that of the fuse 25. The insulating powder 65 will melt (e.g., is designed to melt) earlier than the fuse 25 at a temperature at which a short circuit occurs to the rechargeable battery 100, that is, at a temperature at which the fuse 25 is melted, thereby insulating the fuse 25 positioned below (e.g., at a lower portion of) the insulating powder 65. The melted insulating powder 65 insulates the fuse 25.

In another embodiment of the present invention, the insulating powder 65 may fill a region between the fuse 25 and the insulation cover 62. Here, the insulating powder 65 may fill a groove of the insulation cover 62 which is adjacent to the fuse 25.

Therefore, according to an embodiment of the present invention, the insulating powder 65 is provided over the fuse 25, thereby insulating the fuse 25 through the melted insulating powder 65 before a fuse function is actuated, while suppressing (e.g., preventing or reducing) deterioration of the rechargeable battery.

While the rechargeable battery of the present invention has been described in connection with what is presently considered to be practical, exemplary embodiments, it is to be understood that the invention is not limited to the disclosed embodiments, but rather is intended to cover various modifications and equivalent arrangements included within the spirit and scope of the appended claims.

What is claimed is:

1. A rechargeable battery comprising:
   an electrode assembly comprising a first electrode plate, a second electrode plate, and a separator between the first electrode plate and the second electrode plate;
   a first current collector plate electrically coupled to the first electrode plate and comprising a fuse;
   a second current collector plate electrically coupled to the second electrode plate;
   a case accommodating the electrode assembly, the first current collector plate, and the second current collector plate;
   a cap assembly sealing the case and comprising a cap plate;
   a first electrode terminal electrically coupled to the first current collector plate and a second electrode terminal electrically coupled to the second current collector plate, the first electrode terminal and the second electrode terminal passing through the cap plate; and
   an insulation cover surrounding a region between the cap plate and the electrode assembly, the region comprising the first electrode terminal and the fuse,
   wherein the insulation cover defines:
   a first through-hole extending in a first direction from the fuse to the cap plate;
   a second opening extending in the first direction and spaced from the first through-hole and configured to allow the first electrode terminal to pass therethrough; and
   a groove extending in a second direction opposite to the first direction and corresponding to the fuse.

2. The rechargeable battery of claim 1, wherein the first current collector plate comprises:
   a connection part coupled to the first electrode terminal, and
   an extension part extending at an angle from the connection part toward the electrode assembly and electrically coupled to the electrode assembly.

3. The rechargeable battery of claim 2, wherein the fuse is formed at or near a corner at which the connection part and the extension part meet.

4. The rechargeable battery of claim 2, wherein a region where the fuse is located has a smaller width than a region surrounding the fuse in a plane that is substantially parallel to a top surface of the cap plate.

5. The rechargeable battery of claim 1, wherein the insulation cover is formed by insert molding.

6. The rechargeable battery of claim 1, wherein a portion of the first through-hole is filled with insulating powder.

7. The rechargeable battery of claim 6, wherein the insulating powder comprises a glass powder or a powder resin.

8. The rechargeable battery of claim 6, wherein the insulating powder has a melting point that is lower than that of the fuse.

9. The rechargeable battery of claim 1, wherein the groove has a polygonal or circular shape in a plane that is substantially parallel to a top surface of the cap plate.

10. The rechargeable battery of claim 1, wherein a fuse cover seals the first through-hole.

11. The rechargeable battery of claim 10, wherein the fuse cover comprises:
  a horizontal part corresponding to the first through-hole, and
  a vertical part extending from an edge of the horizontal part towards the fuse.

12. The rechargeable battery of claim 11, wherein the vertical part corresponds with a fuse opening in the fuse.

13. The rechargeable battery of claim 11, wherein the fuse cover further comprises:
  a first stepped part at the edge of the horizontal part and directed toward the vertical part.

14. The rechargeable battery of claim 13, wherein a mounting part corresponding to the first stepped part is at an upper portion of the first through-hole.

15. The rechargeable battery of claim 13, wherein the fuse cover further comprises:
  a second stepped part at the edge of the horizontal part in a direction opposite to the vertical part.

16. The rechargeable battery of claim 1, wherein the cap assembly comprises:
  a first short-circuit plate, which is an inversion plate, installed in a short-circuit opening in the cap plate; and
  a second short-circuit plate electrically coupled to the second current collector plate, located outside of and spaced from the cap plate, and covering the short-circuit opening.

17. A rechargeable battery comprising:
  an electrode assembly comprising a first electrode plate, a second electrode plate, and a separator between the first electrode plate and the second electrode plate;
  a first current collector plate electrically coupled to the first electrode plate and comprising a fuse;
  a second current collector plate electrically coupled to the second electrode plate;
  a case accommodating the electrode assembly, the first current collector plate, and the second current collector plate;
  a cap assembly sealing the case and comprising a cap plate;
  a first electrode terminal electrically coupled to the first current collector plate and a second electrode terminal electrically coupled to the second current collector plate, the first electrode terminal and the second electrode terminal passing through the cap plate; and
  an insulation cover surrounding a region between the cap plate and the electrode assembly, the region comprising the first electrode terminal and the fuse,
  wherein the insulation cover defines:
    a first through-hole extending in a first direction from the fuse to the cap plate;
    a second opening extending in the first direction and spaced from the first through-hole and configured to allow the first electrode terminal to pass therethrough; and
    a groove extending in a second direction opposite to the first direction and corresponding to the fuse;
  wherein the first through-hole contains insulating powder.

18. The rechargeable battery of claim 17, wherein the insulating powder comprises a glass powder or a powder resin.

19. The rechargeable battery of claim 18, wherein the insulating powder has a melting point that is lower than that of the fuse.

* * * * *